Aug. 2, 1966 D. W. ROWELL 3,263,468
METHOD AND APPARATUS FOR EXTRUSION OF TUBES
Filed April 21, 1965 4 Sheets-Sheet 1

INVENTOR
DOUGLAS W. ROWELL
BY
ATTORNEYS

INVENTOR
DOUGLAS W. ROWELL
BY
Pennie, Edmonds, Morton, Barrows & Taylor
ATTORNEYS

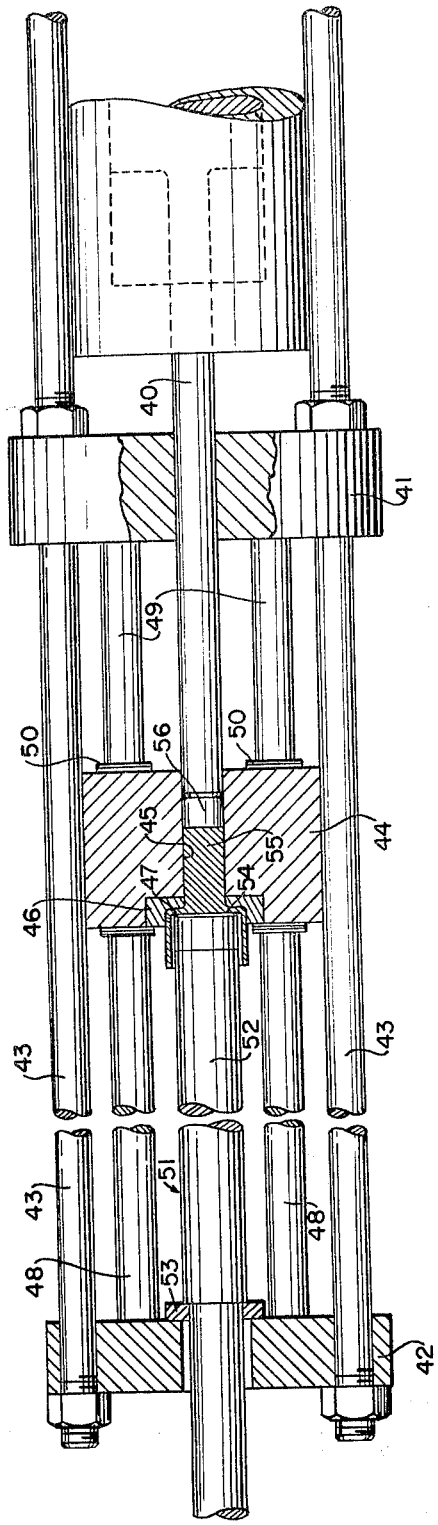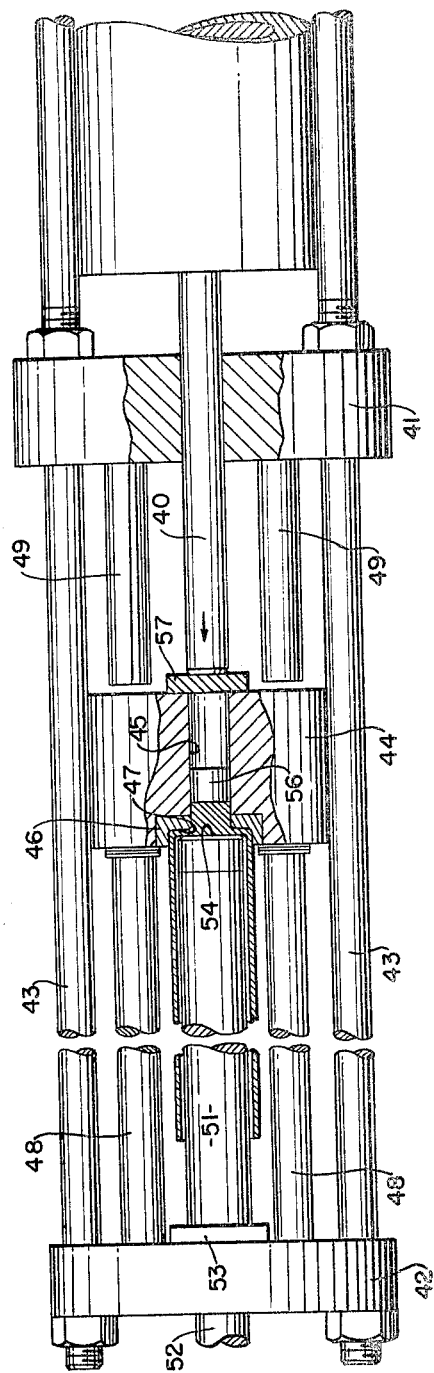

United States Patent Office 3,263,468
Patented August 2, 1966

3,263,468
METHOD AND APPARATUS FOR EXTRUSION OF TUBES
Douglas W. Rowell, Litchfield, Conn., assignor to Anaconda American Brass Company, a corporation of Connecticut
Filed Apr. 21, 1965, Ser. No. 452,446
12 Claims. (Cl. 72—267)

This application is a continuation-in-part of prior application Serial No. 171,663, filed February 7, 1962, now abandoned.

This invention relates to a method and apparatus for extruding tubes having a larger diameter than the billet from which it is extruded and, more particularly, to an extrusion press having a novel die and mandrel arrangement which permits a tube to be extruded having an inside diameter larger than the diameter of the mandrel.

In order to prepare billets for subsequent drawing or rolling operations it is necessary to forge or in some other manner convert the billet into a substantially tubular member. Forging operations or any extrusion operations heretofore attempted in which the resultant tubular member is of larger diameter than the billet from which it is forged or extruded, have resulted in a tubular member having an inside diameter which substantially corresponds to the sizing diameter of the mandrel. As a result, it was ordinarily difficult to remove the tubes from the mandrel about which it was extruded or forged since it conformed so closely to the mandrel and would often bind thereon.

It is an object of this invention to provide a method and apparatus for extruding tubes from billets wherein the resultant tube has a larger inside diameter than the diameter of the mandrel about which it is extruded and has a wall of relatively uniform thickness. I have found by controlling the flow of the metal so that it extrudes outwardly and away from the mandrel against a die surface, a tube having an inside diameter larger than the diameter of the mandrel can be extruded. Owing to the fact that the inside diameter of the extruded tube is larger than that of the mandrel, there is no binding of the tube on the mandrel and the tube can therefore be quickly and easily removed. Moreover, this can all be done while maintaining substantial control over the diameter and wall thickness of the tube. It is a further object of the invention to extrude the metal outwardly beyond the maximum sizing diameter of the tube and then direct metal flow axially by the inherent strength of the metal. Finally, by extruding the metal outwardly substantially perpendicular to the axis of the extrusion apparatus, greater concentricity in the extruded tube can be achieved with less attention to the initial positioning of the parts.

This apparatus has proven particularly advantageous in the starting of large diameter tubes. Billets of a smaller diameter than the diameter of the tube desired can be formed by extruding a tube in the manner described above whereby a larger diameter tube is attained. Since the extruded tube will have both a relatively uniform diameter and a wall of substantially uniform thickness, the number of subsequent operations necessary to finish the tube to its desired diameter, length and wall thickness is greatly reduced. Moreover, owing to the fact that tubes extruded with the new apparatus will not bind on the mandrel, but will be spaced from the mandrel, the extruded tubes can be quickly and efficiently removed from the extrusion apparatus thereby permitting a plurality of tubes to be started in less time than heretofore possible.

Broadly stated the invention is in an extrusion apparatus for producing an extruded tube wherein said press has a billet chamber and a ram for forcing a billet through a chamber. The improvement includes an outwardly flared die at the outlet and of the billet chamber, and a mandrel about which the billet is extruded into tube form. The mandrel has a flared mandrel surface extending outwardly at an angle to the axis of the press and terminating in a maximum sizing diameter and the die has a flared die surface extending outwardly from the outlet end of the billet chamber to a diameter greater than the maximum sizing diameter of the mandrel. The mandrel surface and the die surface are in axial spaced relationship and define therebetween outwardly extending aperture sizing means for sizing the wall thickness of the tube and directing metal flow outwardly away from said mandrel and axially into an extruded tube having an inside diameter greater than the maximum sizing diameter of the mandrel. The sizing means can be configured to extrude the metal radially outward perpendicular to the axis of the extrusion press and maximum sizing diameter of the mandrel can be situated in juxtaposition with a cylindrical portion of a die which is larger in diameter than the outside diameter of an extruded tube such that the billet is extruded outwardly away from the mandrel until it abuts the cylindrical portion of the die and is deflected into the form of an extruded tube having an inside diameter greater than the maximum sizing diameter of the mandrel.

The method of the invention for extruding tubes consists of upsetting a billet about a mandrel and forcing the upset billet outwardly to a first position in an annular aperture between the mandrel and a die. The billet is then extruded outwardly beyond the first position to form a tubular wall of greater diameter than the diameter of the billet before upsetting about the mandrel and to size the thickness of the wall of the tube. The tubular wall is forced outwardly to a second position away from the mandrel to a greater diameter than the diameter of the tubular wall at the first position. The outward flow is then changed to an axial direction at the second position to form a tube shape which is free from the mandrel except at said first position.

Preferred embodiments of the invention are described hereinbelow with reference to the drawings wherein:

FIG. 4 is a plan view partly broken away and partly in section of a second embodiment of extrusion apparatus during extrusion;

FIG. 5 is a plan view partly broken away and partly in section of the apparatus of FIG. 4 in its unloading operation;

Figure 1:
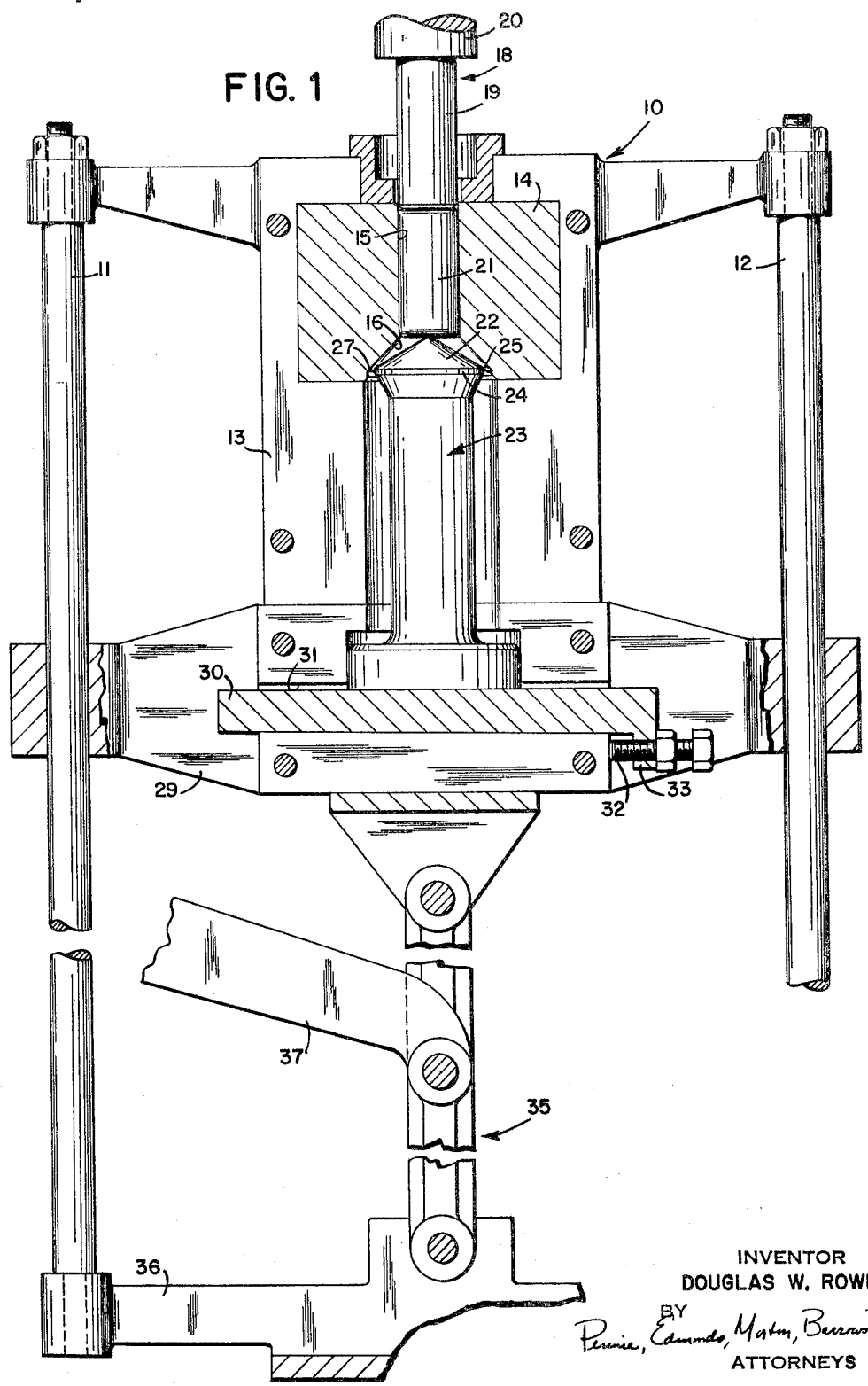
FIG. 1 is an elevation partly in section and partly broken away of one embodiment of the extrusion apparatus prior to extruding.

Referring initially to FIG. 1 the extrusion apparatus 10 includes two parallel columns 11 and 12 on which a stationary die support 13 is suitably mounted. A die block 14 is held within the die support 13 and has a billet chamber 15 formed in the upper portion thereof and flares outwardly to a larger diameter at the bottom portion 16. In an alternative embodiment two separate members could be employed; one serving as the billet chamber and the other serving as the die. Further, the die member could be made a replaceable member thereby permitting many different sized tubes to be extruded by simply substituting different sized die members.

Mounted above the die block 14 and seating on and within the die support 13 is a stepped-diameter retaining ring 17. Axially positioned within the retaining ring 17 and adapted to be driven through the billet chamber 15 is an extrusion ram 18. The extrusion ram 18 has a first portion 19 with a diameter slightly smaller than the diameter of the billet chamber 15 and a second portion 20 of a larger diameter than the first adapted, to seat in the retaining ring 17 upon completion of the stroke of the ram through the chamber. The extrusion ram 18 can be driven by any conventional means such as a hydraulic cylinder.

Figure 3:
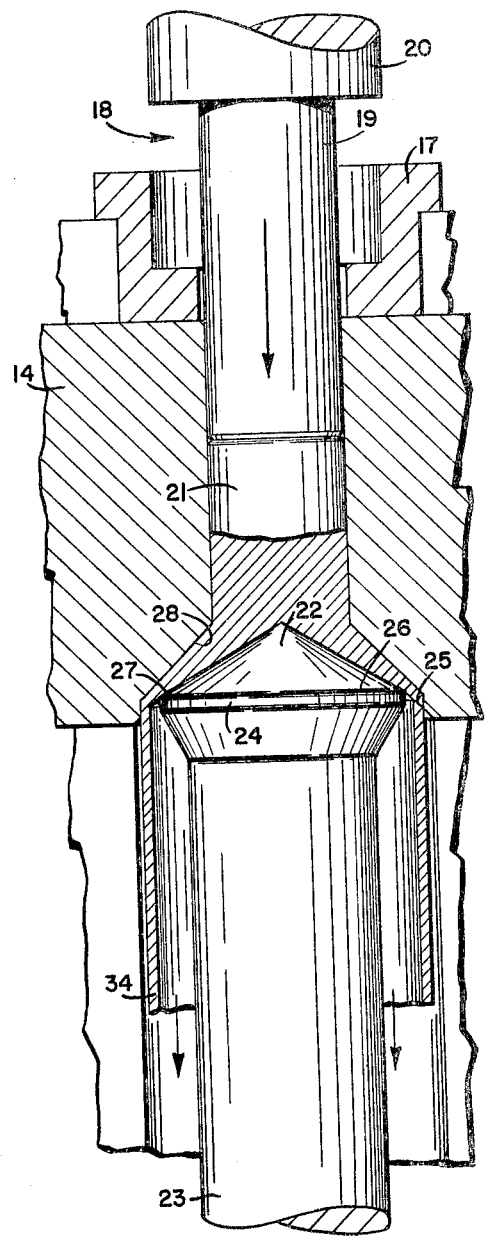
FIG. 3 is an enlarged fragmentary elevation partly in section of a first embodiment of the mandrel and die of the apparatus.

A billet 21 is disposed within the billet chamber 15 and seats on a head 22 of a mandrel 23 which extends into the die support 13 and is concentrically disposed within the die 16. As best shown in FIG. 3, the head 22 is conically shaped, thereby forming a conical working surface, and has an annular shoulder 24 formed substantially at the base of the cone which constitutes the maximum sizing diameter of the mandrel. Substantially radially spaced from the annular shoulder 24 and in juxtaposition therewith is a flat cylindrical die surface 25. The cylindrical die surface 25 is the largest diameter to which the die 16 flares. The conically shaped head 22 and the die 15 forms an annular passageway which converges from the peak of the cone and the outlet end of the billet chamber 15, to the upper edge 26 of the annular shoulder 24. At this point an annular aperture 27 is defined by the edge 26 and the flaring die surface 28 such that it constitutes the smallest space through which the metal can pass as it is extruded, and hence the size of the aperture 27 will determine the thickness of the wall of the tube to be extruded.

The mandrel 23 is mounted on a carriage 29, which, as shown in FIG. 1, underlies the die support 13. The carriage 29 is slidably mounted on the columns 11 and 12. The mandrel 23 seats on an adjustable wedge 30 which is disposed within a slot 31 in the carriage 29. By moving the wedge 30 back and forth within the slot 31, the mandrel head 22 is moved relative to the die 16, thereby providing adjustment to move the mandrel to vary the thickness of the wall of the tube to be extruded. A set screw 32 is provided on a perpendicular portion 33 of the wedge 30 whereby the wedge can be maintained in a fixed position within the slot 31.

Referring now to FIG. 3, when the ram 18 is driven into the billet chamber 15, the billet 21 is upset over the conically shaped head 22 and is forced between the cone and the flaring die 16, issuing out through the annular aperture 27. Owing to the construction of the head 22 and die 16, when the metal issues from the annular aperture 27 it continues to substantially follow the slope of the cone and is extruded outwardly and away from the annular shoulder 24 of the mandrel and against the annular die surface 25. The metal is then deflected off the flat surface 25 and is extruded into a cylindrical tube 34 having an outside diameter determined by the diameter of the flat surface 25, and an inside diameter larger than the diameter of the shoulder 24. As a result of this unusual flow of the metal there is no binding of the metal about the annular shoulder 24, and the tube 34 can easily be removed from the mandrel 23.

Figure 2:
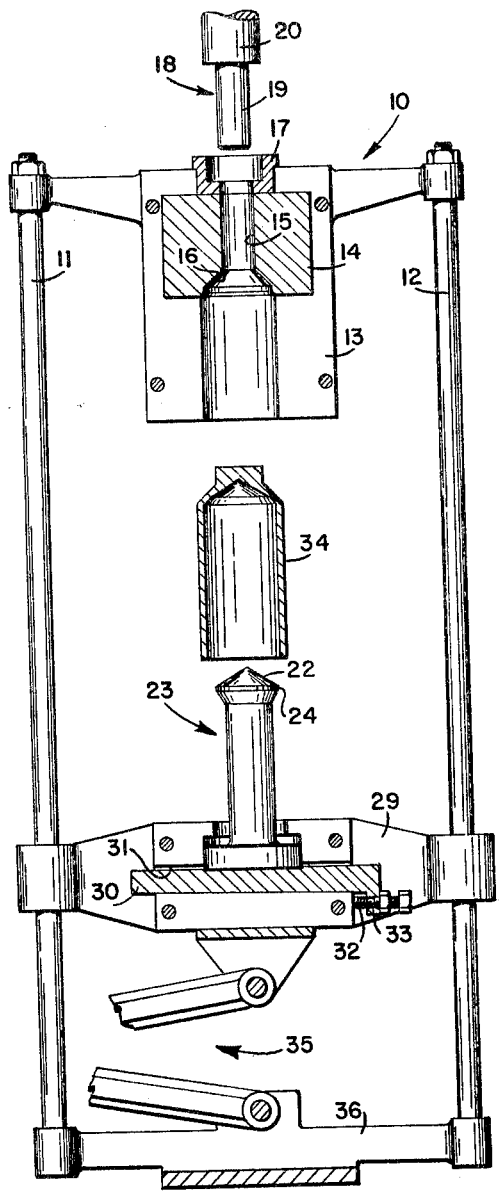
FIG. 2 is an elevation partly in section and partly broken away of the extrusion apparatus of FIG. 1 after extruding.

The unloading operation is accomplished by means of a toggle and lever joint 35. This joint 35 is pivotally attached to the base of the carriage 29 and a base support 36. As shown in FIG. 2, after the tube 34 has been extruded, the lever 37 of the joint 35 is actuated by any suitable means and the carriage 29 will slide along the columns 11 and 12 away from the immediate area of the die support 13. The tube 34 is now substantially clear of any obstructions and can be easily removed from the mandrel 23. A further improvement on the unloading means could include hinging the carriage 29 so that the mandrel 23 is capable of being pivoted on its side to further facilitate removal of the tube 34. Of course, it is not intended that the means for sliding the carriage be limited to the mechanism shown.

One method of the invention resides in extruding a tube from a solid billet having a smaller diameter than the diameter of the tube. It consists in driving a solid hot metal billet about a mandrel to pierce a hole therethrough. The billet is upset into a substantially conical shape and forced through an annular aperture between the mandrel and a die which sizes the thickness of the wall of the tube. The metal is extruded between the die and mandrel outwardly away from the mandrel against the surface of the die to form a tube having an inside diameter larger than the diameter of the mandrel and an outside diameter larger than the diameter of the billet.

Thus, owing principally to the unusual flow of metal realized by such apparatus, a tube extruded about a mandrel does not conform to the shape of the mandrel and does not bind the mandrel so as to prevent ease of removal of the tube therefrom. Moreover, since this method and apparatus provides a useful way of accomplishing the extrusion of large diameter tubes it constitutes a useful and unobvious improvement in extrusion of tubes.

In FIGS. 4 and 5, another embodiment of apparatus for extrusion is shown. It consists of a conventional hydraulically operated ram 40 which extends through a rear platen 41. Axially spaced from the rear platen is a front platen 42 which is joined to the rear platen by tie rods 43, four of which are used and positioned at four quadrants about the platens. Positioned on and within the tie rods 43 is a container 44 which is of a diameter such that it is in limited free axial floating position on the tie rods. The container defines a billet chamber 45 and has a die 46 positioned at the outlet end of the chamber. The die has a die surface 47 which flares outwardly from the outlet end of the billet chamber. Extending from the front and rear platens respectively are a pair of front reinforcing rods 48 and a pair of rear reinforcing rods 49. The reinforcing rods are positioned to hold the container against axial displacement and have shims 50 positioned in abutment between the reinforcing rod and the container surface to permit adjustment of the container axially. Extending through the front platen is an elongated mandrel 51 which is connected to a suitable hydraulic press or the like for moving it axially toward and away from the container. The shaft 52 of the mandrel has a stepped diameter with the largest diameter adjacent the mandrel head so that a split retaining ring 53 can be locked about the mandrel at its small diameter to prevent displacement of the mandrel through the front platen during the extrusion operation. The mandrel head has an outwardly flared mandrel surface 54 which in its extrusion position is axially spaced from the die surface 47 so as to define an annular outwardly extending aperture which leads from the outlet of the billet chamber to the maximum sizing diameter of the mandrel and thereby provide sizing means for determining the wall thickness of the tube being extruded and the diameter of the extruded tube.

In operation the container and the mandrel head are preheated to about 590° C. and solid cylindrical shaped billet 55 is heated to about 775° C. when #274 Alloy (Cu alloy containing about 37% Zn) is used. A dummy block 56 is inserted into the billet chamber and the heated billet is loaded into the front end of the billet chamber. The container has already been aligned to fit in its proper position; this can be accomplished by bringing the mandrel and die surfaces axially together and then inserting shims behind the container which are of proper size to give the exact aperture space between the die and mandrel surfaces under the pressure of extruding the metal outwardly therebetween. After loading, the mandrel 51 is advanced to its position in relation to the die and the split retaining ring 53 is snapped in place to lock the mandrel in place. The extrusion ram 40 is brought forward and the metal is upset in the aperture causing the metal flow to be outward beyond the maximum sizing diameter of the mandrel and then turned axially by deflecting it against a die surface as described in the first embodiment. The extruded tube has an inside diameter greater than the maximum sizing diameter of the mandrel, and there is no locking of the extruded tube onto the mandrel at this point.

In the apparatus shown the maximum sizing diameter of the mandrel was 8.5 inches and the die had a diameter of 10 inches. The billets used were about 5 inches in diameter and 20 inches in length. The extruded tube had an outside diameter of 9⅞ inches and a wall thickness of from .260 to .279 inch and required a ram force of 420 tons.

Upon completion of extrusion the trailing end of the billet is locked in the annular aperture between the respective mandrel and die surfaces. In order to free the extruded tube, the ram is withdrawn from the billet chamber and a plate 57 is placed over the inlet end of the billet chamber; the ram is then brought forward against the plate at sufficient pressure to move the container axially closer to the mandrel which causes sufficient forward and backward extrusion of the metal within the aperture to permit the shims to be removed from between the back surface of the container and the back reinforcing rods. The ram is withdrawn and the mandrel can now be axially advanced toward the container to permit removal of the split retaining ring and then the mandrel can be withdrawn from within the tube. Because the tube does not bind on the mandrel after the mandrel is withdrawn, the tube must then be taken out of the die, and some means, such as a small overhead crane can be used for this purpose.

Figure 6:
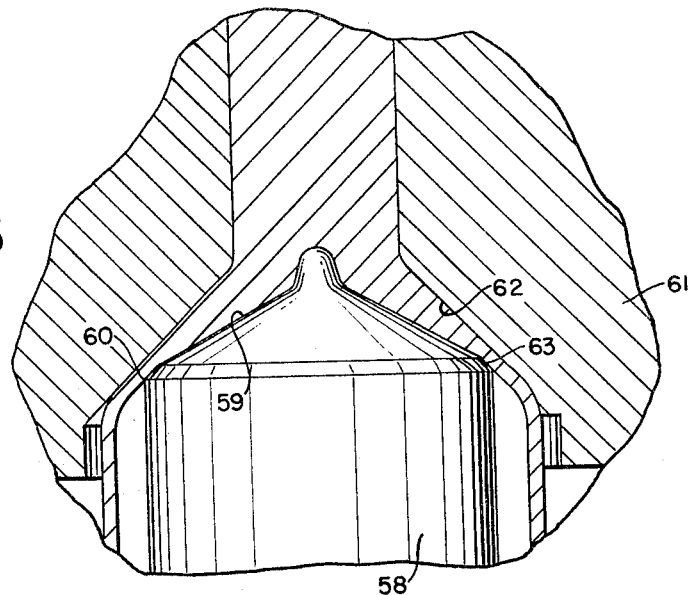
FIG. 6 is an enlarged section of a second embodiment of a die and mandrel configuration.

As shown in FIG. 6, a mandrel 58 having a flared outer and substantially conical mandrel surface 59 with a maximum sizing diameter along the rim 60 at the base of the mandrel surface is positioned within a die 61 having a substantially larger diameter than the maximum sizing diameter of the mandrel. The die has a die surface 62 in axial spaced relationship with the mandrel surface to define an aperture for sizing the extruded tube by directing flow of metal outwardly beyond the maximum sizing diameter of the mandrel and determining the wall thickness of the tube between rim 60 and portion of the die surface closest to the rim perpendicular to the direction of flow of the metal. As shown, an annular sizing surface portion 63 of the mandrel extending inwardly from the rim along a marginal edge portion of the mandrel surface is configured to extend parallel to the opposed die surface when the mandrel and die are positioned for extrusion when tapered tools of this type are used in apparatus such as that shown in FIGS. 4 and 5. The mandrel is brought forward in contact with the die surface; specifically, the annular sizing surface portion 63 contacts the die surface and then the apparatus is shimmed in the manner described above. Then the extrusion ram is brought forward and the metal is upset in the aperture and is distributed therein to position the mandrel and die in proper concentric relationship and lock them coaxially at the start. By this initial upsetting of the billet the apparatus is prestressed before extrusion takes place. It is to be noted that unlike the first embodiment, the arrangement of the apparatus does not require a cylindrical deflecting surface in the die to determine the diameter of the tube; it has been found that the inherent strength of the metal, when directed outwardly at an angle to the axis of the apparatus with tapered tools of the type described, is such that continued extrusion will cause the metal to be extruded outwardly until its inherent outward limit is reached, and it then will turn and be axially advanced in tube form as shown in FIG. 6.

When the extrusion ram is brought forward, the metal begins to flow outwardly and is sized between the annular sizing surface and an opposed parallel surface portion of the die surface. The annular sizing surface 63 has another function besides sizing of the wall thickness. With tapered tools, the rim 60 against which the metal flows in its last contact with the mandrel is subject to wear; by providing the annular sizing surface along the marginal edge of the mandrel surface leading to the rim, the surface, rather than the rim or edge, takes up much of the friction-causing flow, and the life of the mandrel is substantially increased.

During the extrusion operation with these tapered tools it has been determined that there is a substantial intensification of total pressure inside the aperture resulting from a hydraulic couple. This hydraulic couple effect is such that the pressure in the tie rods is intensified to the extent that the total pressure on the metal during extrusion is greater than that being exerted by the extrusion ram.

Figure 7:
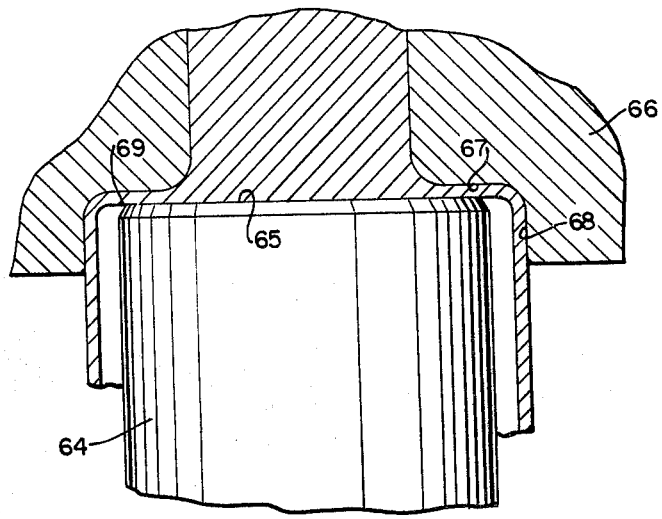
FIG. 7 is an enlarged section of a third embodiment of a die and mandrel configuration.

An enlarged view of a mandrel 64 having a flat mandrel surface 65 such as shown in FIGS. 4 and 5 which extends perpendicular to the axis of the apparatus is shown in FIG. 7. A die 66 is provided with a die surface 67 also extending outwardly from the outlet end of the billet chamber substantially perpendicular to the axis of the apparatus. A cylindrical die surface 68 is provided at the outermost end of the die surface. The maximum sizing diameter of the mandrel, which is defined by the rim 69 of the mandrel at the outermost end of the mandrel surface, is in juxtaposition with the cylindrical surface. The mandrel and die surfaces thus define an annular aperture which extends outwardly from the outlet end of the billet substantially perpendicular to the axis of the apparatus. As the metal is extruded through the aperture, the wall thickness of the tube being extruded is determined therebetween, and the metal is directed outwardly into contact with the cylindrical die surface 68 where it is deflected from its direction of travel radially outward at an angle of 90° to the axis of the apparatus to a new direction parallel to the axis of the apparatus to form a cylindrical tube.

In addition to the advantages realized by the other tools of upward extrusion, when this radial extrusion at an angle of substantially 90° to the axis of the apparatus is used, the mandrel and die do not have to be coaxially aligned to achieve concentricity in the extruded tube. The thickness of the wall is determined by axial spacing only and the outside diameter is determined by deflection; thus, some degree of location of mandrel out of coaxial alignment is permitted.

It is intended that when the outlet of the billet chamber is mentioned herein, it means the outlet immediately adjacent the mandrel head from which metal flows under the force of a ram. Thus, if it is desired to extrude say 5 inch diameter or less tubes from a 5 inch billet, the cylindrical billet chamber shown can be reduced in diameter progressively so that the outlet therefrom is substantially smaller than 5 inches adjacent the mandrel head; but extrusion from this outlet is outward beyond the diameter of the mandrel in the manner of the invention. Also it is intended that the billet chamber outlet within the intended meaning shall mean the outlet adjacent the mandrel head even though this outlet is partially defined by a die as shown in the drawings. It is also intended that the mandrel shaft can be larger in diameter than the mandrel head in some instances, provided it is no larger than the inside diameter of the tube; otherwise the tube would bind on the mandrel shaft and defeat one purpose of the invention.

I claim:

1. In an extrusion press for producing an extruded tube wherein said press has a billet chamber and a ram for driving a billet through a billet chamber, the improvement in combination therewith comprising an outwardly flared die at the outlet end of the billet chamber, a mandrel about which the billet is extruded into tube form, said mandrel having a flared mandrel surface extending outwardly at an angle to the axis of the press and terminating in a maximum sizing diameter, said die having a flared die surface extending outwardly from the outlet end of the billet chamber to a diameter greater than the maximum sizing diameter of the mandrel, the mandrel surface and the die surface being in axial spaced relationship and defining therebetween outwardly extending aperture sizing means for sizing the wall thickness of the tube and directing metal flow outwardly away from said mandrel and axially into an extruded tube having an inside diameter greater than the maximum sizing diameter of said mandrel.

2. In an extrusion press according to claim 1 wherein said die having a substantially cylindrical portion of larger diameter for sizing the outside diameter of an extruded tube and said mandrel having its maximum sizing diameter situated in juxtaposition with the cylindrical portion of the die such that said billet is extruded outwardly away from said mandrel until it abuts said cylindrical portion of said die and then forms an extruded tube having an inside diameter greater than the maximum sizing diameter of the mandrel.

3. In an extrusion press according to claim 2 wherein said flared mandrel and die surfaces respectively extend outwardly substantially perpendicular to the axis of the extrusion press.

4. In an extrusion press for producing an extruded tube wherein said press has a billet chamber and a ram adapted to drive a billet through said billet chamber, sizing means comprising an annular die at the outlet end of the billet chamber, said die having a substantially cylindrical portion of larger diameter than the billet at the outlet end of the chamber for sizing the outside diameter of an extruded tube, and a mandrel for sizing the wall thickness of the tube, said mandrel spaced concentrically within the die and having a maximum sizing diameter situated in juxtaposition with the cylindrical porton of said die and defining with said die an annular aperture through which said billet is extruded, said juxtaposition of said die and said mandrel being such that said billet is extruded outwardly away from said mandrel until it abuts said cylindrical portion of said die and then forms an extruded tube having an inside diameter greater than the maximum sizing diameter of said mandrel.

5. In an extrusion press having a substantially cylindrical billet chamber and a ram adapted to drive a billet through said billet chamber, sizing means for extruding tubes having a larger outside diameter than the diameter of the billet chamber, comprising an annular die at the outlet end of the billet chamber, said die having a substantially cylindrical portion of a diameter larger than the diameter of said billet at the outlet end of the chamber for sizing the outside diameter of an extruded tube and a substantially flared portion between the cylindrical portion of said die and said billet chamber, and a mandrel for sizing the wall thickness of the tube, said mandrel spaced concentrically within said die and having a maximum sizing diameter situated in juxtaposition with the cylindrical portion of said die and defining with said flared portion of said die a first annular aperture through which said billet is extruded outwardly away from said mandrel, said maximum sizing diameter of said mandrel defining with said cylindrical portion of said die a second annular aperture situated on the downstream side of said first aperture into which said outwardly extruded billet passes from said first aperture and in which said extruded billet is deflected longitudinally by abutting the cylindrical portion of said die such that a tube is formed having an inside diameter greater than the maximum sizing diameter of said mandrel.

6. In an extrusion press having a substantially cylindrical billet chamber and a ram adapted to drive a billet through said chamber, sizing means for extruding tubes having a larger outside diameter than the diameter of the billet chamber, comprising an annular die at the outlet end of said billet chamber, said die having a substantially cylindrical portion of a diameter greater than the diameter of said billet at the outlet end of the chamber for sizing the outside diameter of an extruded tube and a substantially conical portion joining the cylindrical portion of said die to said billet chamber, and a mandrel for sizing the wall thickness of the finished tube spaced concentrically within said die, said mandrel having a substantially conical working surface and a maximum sizing diameter situated in juxtaposition with the cylindrical portion of said die and defining with said conical portion of said die a first annular aperture through which said billet is extruded outwardly away from said mandrel, said maximum sizing diameter of said mandrel defining with said cylindrical portion of said die a second annular aperture situated on the downstream side of said first aperture into which said outwardly extruded billet passes from said first aperture and in which said extruded billet is deflected longitudinally by abutting the cylindrical portion of said die such that a tube is formed having an inside diameter greater than the maximum sizing diameter of said mandrel.

7. In an extrusion press having a substantially cylindrical billet chamber and a ram adapted to drive a billet through said chamber, sizing means for extruding tubes having a larger outside diameter than the diameter of said billet chamber, comprising an annular die at the outlet end of said billet chamber, said die having a substantially cylindrical portion of a diameter greater than the diameter of said billet at the outlet end of the chamber for sizing the outside diameter of an extruded tube and a substantially conical portion joining the cylindrical portion of said die to said billet chamber, and a mandrel for sizing the wall thickness of the tube spaced concentrically within said die, said mandrel comprising a body portion and a head portion having a substantially conical working surface, said head portion having a diameter greater than the diameter of said body portion and providing a maximum sizing diameter situated in juxtaposition with the cylindrical portion of said die and defining with said conical portion of said die a first annular aperture through which said billet is extruded outwardly away from said mandrel, said maximum sizing diameter of said mandrel defining with said cylindrical portion of said die a second annular aperture situated on the downstream side of said first aperture into which said outwardly extruded billet passes from said first aperture and in which said extruded billet is deflected longitudinally by abutting the cylindrical portion of said die such that a tube is formed having an inside diameter greater than the maximum sizing diameter of said mandrel.

8. In an extrusion press having a substantially cylindrical billet chamber and a ram adapted to drive a billet through said chamber, sizing means for extruding tubes having a larger outside diameter than the diameter of said billet chamber, comprising an annular die at the outlet end of said billet chamber, said die having a substantially cylindrical portion of a diameter greater than the diameter of said billet at the outlet end of the chamber for sizing the outside diameter of an extruded tube and a substantially conical portion joining said cylindrical portion of said die to said billet chamber, a mandrel for sizing the wall thickness of the finished tube spaced concentrically within said die, and adjustment means for selectively positioning said mandrel relative to said die to vary the wall thickness of the finished tube while holding the outside diameter of said tube constant, said mandrel having a substantially conical working surface and a maximum sizing diameter situated in juxtaposition with the cylindrical portion of said die and defining with said conical portion of said die a first annular aperture through which said billet is extruded outwardly away from said mandrel, said maximum sizing diameter of said mandrel defining with said cylindrical portion of said die a second annular aperture situated on the downstream side of said first aperture into which said outwardly extruded billet passes from said first aperture and in which said extruded billet is deflected longitudinally by abutting the cylindrical portion of said die such that a tube is formed having an inside diameter greater than the maximum sizing diameter of said mandrel.

9. In an extrusion press having a substantially cylindrical billet chamber and a ram adapted to drive a billet through said chamber, sizing means for extruding tubes having a larger outside diameter than the diameter of the billet chamber, comprising an annular die at the outlet end of said billet chamber, said die having a substantially cylindrical portion of a diameter greater than the diameter of said billet at the outlet end of the chamber for sizing the outside diameter of an extruded tube and a substantially conical portion joining said cylindrical portion of said die to said billet chamber, a mandrel for sizing the wall thickness of the finished tube spaced concentrically within said die, adjustment means for selectively positioning the mandrel relative to the die to vary the wall thickness of the finished tube while holding the outside diameter of said tube constant, and unloading means for removing the mandrel with the extruded tube thereon remote from the immediate area of the die, said mandrel comprising a body portion and a head portion having a substantially conical working surface, said conical surface situated concentrically within the conical portion of said die, said head portion having a diameter greater than the diameter of said body portion and providing a maximum sizing diameter situated in juxtaposition with the cylindrical portion of said die and defining with said conical portion of said die a first annular aperture through which said billet is extruded outwardly away from said mandrel, said maximum sizing diameter of said mandrel defining with said cylindrical portion of said die a second annular aperture situated on the downstream side of said first aperture into which said outwardly extruded billet passes from said first aperture and in which said extruded billet is deflected longitudinally by abutting the cylindrical portion of said die such that a tube is formed having an inside diameter greater than the maximum sizing diameter of said mandrel.

10. A method for extruding tubes which comprises upsetting a solid billet about a mandrel, forcing the upset billet outwardly to a first position in an annular aperture between the mandrel and a die, forming a tubular wall of greater diameter than the diameter of the billet and sizing the thickness of the wall of the tube by extruding the billet outwardly beyond said first position, forcing the tubular wall outwardly to a second position away from the mandrel to a greater diameter than the diameter of the tubular wall at said first position, and changing the outward flow of the tubular wall to an axial flow at the second position to form a tube shape which is free from the mandrel except at said first position.

11. A method for extruding tubes which comprises upsetting a solid billet about a mandrel, forcing the upset billet outwardly to a first position in an annular aperture between the mandrel and a die, forming a tubular wall of greater diameter than the diameter of the billet and sizing the thickness of the wall of the tube by extruding the billet outwardly beyond said first position, forcing the tubular wall outwardly to a second position away from the mandrel to a greater diameter than the diameter of the tubular wall at said first position, and deflecting the tubular wall at the second position into a tube shape which is free from the mandrel except at said first portion.

12. A method according to claim 11 wherein said billet is extruded radially outwardly substantially perpendicular to the axis of the extrusion apparatus.

References Cited by the Examiner
UNITED STATES PATENTS

| | | | |
|---|---|---|---|
| 603,787 | 5/1898 | Holinger | 72—257 |
| 1,480,843 | 1/1924 | Singer | 72—267 |
| 1,902,975 | 3/1933 | Sparks | 72—267 |
| 1,104,222 | 1/1938 | Decker | 72—267 |
| 2,237,993 | 4/1941 | Korbuly | 72—273 |
| 2,819,794 | 1/1958 | Krause | 72—273 |
| 2,913,107 | 11/1959 | Biginelli | 72—267 |
| 3,080,650 | 3/1963 | Jury | 72—267 |

H. D. HOINKES, *Assistant Examiner.*

CHARLES W. LANHAM, *Primary Examiner.*